US012667826B2

(12) United States Patent
Mueller et al.

(10) Patent No.: US 12,667,826 B2
(45) Date of Patent: Jun. 30, 2026

(54) HYDROTALCITE-PRECURSOR BASED CATALYST WITH IMPROVED PERFORMANCE FOR LTS REACTION

(71) Applicant: CLARIANT INTERNATIONAL LTD, Muttenz (CH)

(72) Inventors: Tobias Mueller, Bad Aibling (DE); Stephan J. Reitmeier, Kirchseeon (DE); Hongyi C. Hou, Sunnyvale, CA (US); Claus G. Lugmair, Santa Cruz, CA (US)

(73) Assignee: CLARIANT INTERNATIONAL LTD, Muttenz (CH)

( * ) Notice: Subject to any disclaimer, the term of this patent is extended or adjusted under 35 U.S.C. 154(b) by 644 days.

(21) Appl. No.: 18/121,637

(22) Filed: Mar. 15, 2023

(65) Prior Publication Data

US 2023/0398519 A1 Dec. 14, 2023

Related U.S. Application Data

(60) Provisional application No. 63/366,078, filed on Jun. 9, 2022.

(51) Int. Cl.
| | |
|---|---|
| *B01J 23/80* | (2006.01) |
| *B01J 6/00* | (2006.01) |
| *B01J 21/04* | (2006.01) |
| *B01J 23/00* | (2006.01) |
| *B01J 35/37* | (2024.01) |

(Continued)

(52) U.S. Cl.
CPC ............... *B01J 23/80* (2013.01); *B01J 6/001* (2013.01); *B01J 21/04* (2013.01); *B01J 23/002* (2013.01); *B01J 35/37* (2024.01);

*B01J 35/70* (2024.01); *B01J 35/80* (2024.01); *B01J 37/031* (2013.01); *B01J 37/04* (2013.01); *B01J 37/06* (2013.01); *B01J 37/08* (2013.01); *C01B 3/16* (2013.01); *B01J 35/38* (2024.01); *B01J 2235/15* (2024.01);

(Continued)

(58) Field of Classification Search
CPC . B01J 6/001; B01J 21/04; B01J 23/002; B01J 23/80; B01J 35/37; B01J 35/38; B01J 35/613; B01J 35/615; B01J 35/633; B01J 35/647; B01J 35/70; B01J 35/80; B01J 37/0009; B01J 37/031; B01J 37/04; B01J 37/06; B01J 37/08; C01B 2203/1076

See application file for complete search history.

(56) References Cited

U.S. PATENT DOCUMENTS

| | | | | |
|---|---|---|---|---|
| 4,596,782 A | * | 6/1986 | Courty | B01J 23/80 252/373 |
| 4,788,175 A | | 11/1988 | Short | |

(Continued)

FOREIGN PATENT DOCUMENTS

| | | |
|---|---|---|
| CN | 105214671 | 1/2016 |
| CN | 107583650 | 1/2018 |

(Continued)

OTHER PUBLICATIONS

Zhang, X., et al., 2010, Fuel, 89, 1348-1352. <https://doi.org/10.1016/j.fuel.2009.06.011> (Year: 2010).*

(Continued)

*Primary Examiner* — Brian A McCaig

(57) ABSTRACT

The present invention relates to a novel catalyst for LTS processes, the method of its preparation and LTS process by use of this catalyst.

7 Claims, 2 Drawing Sheets

(51) Int. Cl.

| | |
|---|---|
| *B01J 35/70* | (2024.01) |
| *B01J 35/80* | (2024.01) |
| *B01J 37/03* | (2006.01) |
| *B01J 37/04* | (2006.01) |
| *B01J 37/06* | (2006.01) |
| *B01J 37/08* | (2006.01) |
| *C01B 3/16* | (2006.01) |
| *B01J 35/38* | (2024.01) |

(52) U.S. Cl.

CPC ................. *C01B 2203/0283* (2013.01); *C01B 2203/1005* (2013.01); *C01B 2203/1076* (2013.01)

(56) References Cited

U.S. PATENT DOCUMENTS

| | | | |
|---|---|---|---|
| 6,627,572 | B1 | 9/2003 | Cai |
| 6,693,057 | B1 | 2/2004 | Cai |
| 7,776,785 | B2 | 8/2010 | Takatsu |
| 8,088,708 | B2 | 1/2012 | Takatsu |
| 9,663,725 | B2 | 5/2017 | Bourane |
| 2010/0102278 | A1 | 4/2010 | Madon |
| 2014/0309102 | A1 | 10/2014 | Basile |
| 2017/0348675 | A1 | 12/2017 | Faure |

FOREIGN PATENT DOCUMENTS

| | | |
|---|---|---|
| CN | 109364941 | 2/2019 |
| JP | 2009241036 | 10/2009 |

OTHER PUBLICATIONS

Dalin Li, Ind. Eng. Chem. Res., 2017, 56 (12), 3175-3183 "Characterization and Catalytic Performance of Cu/ZnO/Al2O3 Water-Gas Shift Catalysts Derived from Cu—Zn—Al Layered Double Hydroxides".

Zhenhua Zhang, Nature Communications 8, 488 "The most active Cu facet for low-temperature water gas shift reaction".

M.J.L. Gines, Appl. Catal. A, 1995, 131, 283-296 "Activity and structure-sensitivity of the water-gas shift reaction over Cu—Zn-Al mixed oxide catalysts".

Malte Behrens, Chem. Mater. 2010, 22, 2,386-397, "Phase-Pure Cu,Zn,Al Hydrotalcite-like Materials as Precursors for Copper rich Cu/ZnO/Al2O3 Catalysts".

Stefanie Kohl, Chem. Eur. J. 2014, 20,3782-3792 "Cu-Based Catalyst Resulting from a Cu,Zn,Al Hydrotalcite-Like Compound: A Microstructural, Thermoanalytical, and In Situ XAS Study".

M. G. Kalchev, Kinet. Catal. 1995, 36, 821-827.

Chandra Ratnasamy., Catalysis Reviews, 51, 325-440, 2009 "Water Gas Shift Catalysis".

* cited by examiner

HYDROTALCITE-PRECURSOR BASED CATALYST WITH IMPROVED PERFORMANCE FOR LTS REACTION

CROSS-REFERENCE TO RELATED APPLICATIONS

This application claims the benefit of priority of U.S. Provisional Patent Application No. 63/366,078, filed Jun. 9, 2022, which is hereby incorporated herein by reference in its entirety.

The present invention relates to a novel catalyst for LTS reaction, the method of its preparation and an LTS reaction by use of this catalyst.

BACKGROUND OF THE INVENTION

For the production of many basic chemicals, such as methanol or ammonia, but also for the production of hydrogen, synthesis gas plays an important role as feedstock.

To adjust the concentration of the components CO, $CO_2$ and $H_2$ within synthesis gas feedstocks to an optimal level for their commercial use in different reactions, water gas shift reactions are typically employed.

Usually, two types of water gas shift reactions are commercially employed: While the high temperature shift (HTS) reaction is typically conducted at higher temperatures in the range of from 350-400° C., the low temperature shift (LTS) reaction takes place at lower temperatures, typically in a range of from 150 to 250° C., as exemplarily disclosed by C. Ratnasamy et al., Catalysis Reviews, 51:325-440, 2009.

U.S. Pat. No. 6,693,057 B1 discloses a copper/zinc/ aluminum LTS catalyst. The catalyst is formed from a precursor, wherein the precursor includes aluminum in the form of hydrotalcite and aluminum separate from the hydrotalcite.

In CN 105214671 A the preparation of a Cu/ZnAl$_2$O$_4$ LTS catalyst is described, wherein the catalyst comprises an active component and a carrier, wherein the active component is copper, the carrier is Cu/ZnAl$_2$O$_4$, and the copper content is 10-40 wt %. A Cu—Zn—Al hydroxide intermediate product synthesized through a coprecipitation method is used as a precursor, whereby a solution comprising Cu, Zn and Al compounds are added to a carbonate-containing solution.

JP 2009241036 A relates to the preparation of a water gas shift catalyst, by combining a Cu—Zn—Al containing solution with alkaline lye. The obtained catalyst reveals a characteristic X-ray diffraction pattern.

While numerous LTS catalyst types have been commercialized for decades, there is still a need for LTS catalyst showing improved catalytic behavior as compared to the state-of-the art catalyst types.

Thus, the object of this invention was to provide a catalyst for an LTS reaction, which is characterized by an improved CO conversion and a decreased deactivation behavior, when used in LTS reaction.

This object was achieved by a catalyst for an LTS reaction, which comprises a Cu—Zn—Al mixed oxide being amorphous.

The inventive catalyst can be obtained by a method, comprising the following steps:
- a) Providing an aqueous solution comprising solved Cu, Zn and Al compounds
- b) Providing an aqueous alkaline solution comprising a carbonate

- c) mixing the solution obtained in step a) and the carbonate solution obtained in step b) to obtain a mixture comprising a precipitate of mixed Cu—Zn—Al hydroxide-carbonate
- d) Ageing the mixture obtained after step c)
- e) Separating the precipitate from the solution and optionally washing and/or drying the precipitate
- f) Calcining the precipitate at a temperature in the range of from 200 to 600° C. for a duration in the range of from 0.5 h to 6 h The aqueous solution of copper compounds, zinc compounds and aluminum compounds is, for example, produced by dissolving at least one copper compound, at least one zinc compound and at least one aluminum compound in an aqueous solution, whereby the aqueous solution can be water, preferably deionized water, with a pH value of 7 or an acidic aqueous solution. As a preferred acidic aqueous solution nitric acid solution is used. In a preferred embodiment the aqueous solution comprising solved Cu, Zn and Al compounds is an acidic solution.

In principal all copper compounds, zinc compounds and aluminum compounds can be chosen, which are soluble in water or acidic solutions, like their corresponding metals, oxides or metal salts. Preferably the copper compounds, zinc compounds and aluminum compounds are selected from their corresponding oxides, carbonates, hydroxides, hydroxocarbonates, halides such as chlorides, bromides and/ or iodides, nitrates and/or sulfates.

Preferred copper compounds are copper oxide (Cu$_2$O and/or CuO), copper nitrate, copper chloride, copper carbonate, copper hydroxocarbonate (x·CuCO$_3$·Cu(OH)$_2$, where x can be 1 or 2), copper acetate and copper sulfate, in particular copper nitrate.

Preferred zinc compounds are zinc oxide (ZnO), zinc nitrate, zinc chloride, zinc carbonate, zinc hydroxocarbonate (x·ZnCO$_3$·Zn(OH)$_2$, where x can be 1 or 2), zinc acetate and zinc sulfate, in particular zinc nitrate or zinc oxide.

Preferred aluminum compounds are aluminum nitrate, aluminum hydroxide, aluminum oxide hydrate (boehmite), aluminum chloride, alkali metal aluminates and aluminum oxide (Al$_2$O$_3$), in particular aluminum nitrate or sodium aluminate.

Dissolution of the at least one copper compound, at least one zinc compound and at least one aluminum compound can be done either in one common solution or alternatively by dissolving the compounds in at least two separate solving media. In one embodiment the at least one copper compound is dissolved in one aqueous solution, while the at least one zinc compound and the at least one aluminum compound are dissolved in one common aqueous solution. In another embodiment the at least one aluminum compound is dissolved in a separate aqueous solution, while the at least one copper compound and the at least one zinc compound are dissolved in one common aqueous solution. Before the precipitation in step c) the separate solutions, if present, are combined to result in one solution comprising solved Cu, Zn and Al compounds.

The aqueous solution comprising the carbonate can be produced by dissolving or suspending at least one alkali metal carbonate (e.g. lithium carbonate, sodium carbonate, potassium carbonate, rubidium carbonate or cesium carbonate) or ammonium carbonate or mixtures thereof in water. It is likewise possible to use the corresponding hydrogen carbonates or any mixtures of carbonates and hydrogen carbonates together with or instead of the carbonates. Preferably alkali metal carbonates or ammonium carbonates are used. In one embodiment in addition to the carbonate an alkali metal hydroxide or alkaline earth metal hydroxide or the corresponding solution are added. The pH value of the solution comprising a carbonate is greater than 7, preferably 8 or higher, more preferably 9 or higher.

The metal-containing solution and the carbonate containing solution are mixed in step c) to obtain a mixture comprising a precipitate of mixed Cu—Zn—Al hydroxide-carbonate.

Such mixing can be done, in that the carbonate containing solution is added to the metal-containing solution. This addition leads to an increase of the pH value of the metal-containing solution provided in step a) until a pH value of 7.5 or higher, preferably 8.0 or higher, more preferably 8.5. most preferably 9 is reached. If the pH exceeds a value of 9 it may be adjusted to a pH value of 7.5 to 9, preferably 8.0 to 9, more preferably 8.5 to 9, most preferably 9 by adding additional acid to the mixture obtained in step c). In a further embodiment the metal-containing solution and the carbonate containing solution are jointly added to a further solution, preferably water. In another embodiment, both solutions can be added jointly into a water containing vessel, whereby the pH value can be controlled at a certain level. This joint addition leads to an increase of the pH value of the solution within the vessel until a pH value of 7.5 or higher, preferably 8.0 or higher, more preferably 8.5. most preferably 9 is reached. If the pH exceeds a value of 9 it may be adjusted to a pH value of 7.5 to 9, preferably 8.0 to 9, more preferably 8.5 to 9, most preferably 9 by adding additional acid to the mixture obtained in step c).

Combining the aqueous solution of solved Cu, Zn and Al compounds with the aqueous carbonate-containing solution results in the formation of a precipitate. The precipitate is separated, optionally washed and/or dried and subsequently calcined and optionally formed into a shaped catalyst body.

In one embodiment the at least one aqueous solution of Cu, Zn and Al compounds is heated to a temperature above 30° C., for example to a temperature in the range of from 50° C. to 90° C., in particular to a temperature in the range of from 60° C. to 85° C.

In another embodiment, the at least one carbonate-containing solution is heated to a temperature above 30° C., for example to a temperature in the range of from 50° C. to 90° C., in particular to a temperature in the range of from 60° C. to 85° C.

In a further embodiment, both the at least one aqueous solution of solved Cu, Zn and Al compounds and the at least one carbonate-containing solution are heated to a temperature in the range of from 50° C. to 90° C., in particular to a temperature in the range of from 60° C. to 85° C.

In a preferred embodiment the at least one aqueous solution of Cu, Zn and Al compounds and the at least one carbonate-containing solution are kept at a temperature of at most 30° C., preferably of at most 25° C. before combining.

On combining of the at least one aqueous solution of solved Cu, Zn and Al compounds with the at least one aqueous carbonate-containing solution, a precipitate is formed in the mixture. The combining of the solutions is generally executed in a stirred vessel. The vessel is preferably stirred by means of an inclined-blade stirrer, propeller stirrer or other commercial stirrers.

The pH of the mixture is preferably kept in the range of from 7.5 to 9, preferably in the range of from 8.0 to 9.0, most preferably in the range of from 8.5 to 9.0, after the completed combination of the at least one aqueous solution of Cu, Zn and Al compounds and the at least one carbonate-containing solution and during step d).

In step d) the mixture obtained after step c) is subjected to an ageing step. Here, the mixture is stored for from 5 minutes to 3 hours without further components being added. During step d) the mixture can be kept in motion or stored without any stirring. The ageing temperature usually corresponds to the temperature of the surroundings of the mixture, but can be set in a controlled manner within a range from 0° C. to 90° C.

In step e) the precipitate is separated from the solution. The precipitate is preferably separated by filtration. As an alternative, the precipitate can also be separated by decantation or centrifugation.

The isolated precipitate can optionally be subjected to one or more washing steps before calcination, optionally before drying. Here, the precipitate-containing solution mixture can firstly be separated off from the precipitate using a filter press and water can subsequently be passed through the material in the filter press, thus washing the material. As an alternative, the isolated precipitate can, after removal of the precipitate-containing solution mixture by filtration, decantation or centrifugation, be slurried in a vessel and subsequently once again separated from the liquid phase by means of a filter press, a centrifuge or a decanter. This operation is generally carried out one or more times until a particular electrical conductivity of the filtrate has been achieved. Here, the electrical conductivity correlates with the concentration of dissolved ions. The electrical conductivity of the filtrate from the last washing operation is preferably 0.5 mS/cm or less, in particular 0.2 mS/cm or less. The electrical conductivity is determined in accordance with DIN 38404, part 8.

In one embodiment the separated and optionally washed precipitate is subjected to drying in step e). Drying can, for example, be executed by spray drying. For this purpose, a suspension having a solids content typically of from 10 to 40% by weight is produced from the isolated precipitate, e.g. a filter cake, using water. In one embodiment this suspension is then fed into a spray dryer via a nozzle. The outlet temperature characteristic for the drying is preferably in the range of from 75° C. to 130° C., more preferably in the range of from 90° C. to 120° C. and is usually controlled by means of parameters such as amount of suspension sprayed in, the solids content of the suspension (and thus the amount of water which has to be evaporated) or temperature in the spray dryer. The treatment of the material by means of the spray dryer results, in particular, in a powder having a $H_2O$ content of at most 30 wt. %, preferably of at most 20 wt. %, more preferably of at most 10 wt. %.

In another embodiment drying takes place in a box dryer, rotary dryer, belt dryer or spin flash dryer. The temperature during drying is preferably in the range from 75° C. to 130° C., more preferably in the range of from 90° C. to 120° C. The duration is preferably in a range of from 30 minutes to 15 h.

The precipitate obtained after step e) is characterized by the presence of Cu, Zn and Al in form of a hydrotalcite structure as determined by powder XRD measurements. In a preferred embodiment the precipitate comprises less than 10 wt. %, preferably less than 5 wt. % of Cu, Zn and Al compounds other than the hydrotalcite structure as determined by powder XRD measurements. In a more preferred embodiment the precipitate reveals only a hydrotalcite structure determined by powder XRD measurements.

In step f) the obtained precipitate is subjected to a calcination step, in which the temperature is in the range of from 200° C. to 600° C., preferably in the range of from 200° C. to 500° C., more preferably in the range of from 300° C. to 500° C., most preferably in the range of from 350° C. to 500° C. Calcination duration is in the range from 15 minutes to 8 hours, preferably 30 minutes to 6 hours, more preferably 1 hour to 6 hours. The calcination can be carried out in air or under protective gas, for example argon or nitrogen, under oxygen or mixtures thereof. The calcination can be carried out batchwise, e.g. in a tray furnace, or continuously, e.g. in a rotary tube furnace.

The calcined precipitate obtained after step f) has a carbonate content (determined as released $CO_2$ content) of 10% by weight or less, preferably 7% by weight or less, more preferably from 0.5 to 6% by weight, based on the total weight of the calcined precipitate obtained in step f).

The calcined precipitate obtained after step f) is characterized, in that it comprises a Cu—Zn—Al mixed oxide being amorphous according to the conventional X-ray diffraction. In the context of this invention amorphous Cu—Zn—Al mixed oxide is a solid form whose powder XRD pattern contains no Bragg reflections associated to a Cu—Zn—Al mixed oxide or any Cu, Zn and/or Al compound. The material exhibits no long range order or periodicity of atoms in the conventional X-ray diffraction pattern.

Furthermore, the calcined precipitate obtained after step f) comprises domains of CuO, ZnO and a Zn spinel, preferably a Zn spinel of gahnite structure, as determined by Pair Distribution Function (PDF) analysis.

The calcined precipitate obtained in step f) can be used as a catalyst or subsequently can be formed to obtain a shaped catalyst body in a step g). Forming methods comprise tableting, pelletizing or extrusion. The catalyst body can be present in different forms like spheres, cylinders or hollow spheres like rings. A preferred forming method is tableting. Tableting is preferably carried out using a tableting press, for example a Korsch tableting press. Tableting makes it possible to obtain pellets having a diameter of from 1 to 20 mm, preferably of from 2 to 10 mm and most preferably of from 3 to 5 mm, and a height of from 1 to 10 mm, preferably of from 2 to 10 mm and most preferably of from 3 to 5 mm. In particular, tablets having a side crush strength of from 40 to 250 N, preferably of from 80 to 220 N, more preferably of from 100 to 220 N, most preferably of from 150 to 210 N, are produced. The tablets preferably have a diameter in the range of from 3 to 5 mm, a height in the range of from 3 to 5 mm and a side crush strength in the range of from 150 to 210 N.

Tableting is preferably carried out with addition of lubricants such as graphite, oils or stearates, preferably graphite. Here, the precipitate obtained in step f) is mixed with lubricants, in particular graphite, optionally compacted and/or granulated and then tableted. The lubricant is preferably added in an amount in the range of from 0.1 to 8% by weight, preferably of from 1.0 to 3.0% by weight, based on the total weight of the composition to be tableted, before tableting.

In a further embodiment, the shaped body which has been obtained in step g) is subjected to an additional heat treatment in a step h). The temperature of such heat treatment is performed at a temperature of from 150° C. to 500° C., preferably at a temperature of from 200° C. to 500° C., most preferably at a temperature of from 300° C. to 450° C. The heat treatment can be carried out batchwise or continuously, e.g. in a belt calciner or a tray furnace. The heat treatment is preferably carried out in air or under protective gas, for example argon or nitrogen, under oxygen or mixtures thereof. The heat treatment is preferably carried out over a period of from 30 minutes to 8 hours, preferably over a period of from 1 to 6 hours.

The remaining loss on ignition at 900° C. of the catalysts of the invention is 13% by weight or less, preferably 10% by weight or less, more preferably 5% by weight or less, most preferably 7% by weight or less, for the after-calcined pellets.

In a further embodiment, the shaped catalyst body obtained from step g) or h) is reduced in a step i).

Reduction is preferably carried out by heating of the shaped catalyst body or the after-calcined shaped catalyst body in a reducing atmosphere. In one embodiment, the reducing atmosphere is hydrogen or a mixture of hydrogen and nitrogen. In another embodiment the reducing atmosphere is synthesis gas. Reduction is carried out, for example, at a temperature in the range of from 150° C. to 450° C., in particular in the range of from 180° C. to 250° C., preferably in the range of from 190° C. to 210° C. Reduction is, for example, carried out over a period of from 1 hour to 10 days, preferably over a period of from 2 hours to 72 hours, more preferably over a period of from 24 to 48 hours. In a preferred embodiment, reduction is carried out at a temperature in the range of from 190° C. to 210° C. over a period of from 24 to 48 hours.

The shaped catalyst body is preferably stabilized wet or dry after reduction. In the case of wet stabilization, the shaped body is covered with liquid in order to avoid contact with oxygen as far as possible. Suitable liquids include organic liquids and water, preferably organic liquids. Preferred organic liquids are those which have a vapor pressure of 0.5 hPa or less at 20° C. Examples of suitable organic liquids are isodecanol, Nafol, fatty alcohols, hexadecane, 2-ethylhexanol, propylene glycol and mixtures thereof, in particular isodecanol.

In the case of dry stabilization, a mixture of oxygen or an oxygen-containing gas, preferably air, and an inert gas such as argon or nitrogen is introduced into the reduction reactor. The concentration of oxygen in the mixture is preferably increased from 0.04% by volume to 21% by volume. For example, it is possible to introduce a mixture of air and inert gas in which the ratio of air to inert gas is initially 0.2% by volume of air to 99.8% by volume of inert gas. The ratio of air to inert gas is then gradually increased (e.g. continuously or stepwise) until, for example, 100% by volume of air (which corresponds to an oxygen concentration of about 21% by volume) is fed in at the end. Without being bound to any theory, it is presumed that a thin oxide layer having a thickness of, for example, from 0.5 to 50 nm, preferably of from 1 to 20 nm, in particular of from 1 to 10 nm, is formed on the surface of the catalyst as a result of the introduction of air or oxygen and protects the catalyst against further oxidation. In the case of dry stabilization, the reactor temperature is preferably 100° C. or less, more preferably from 20° C. to 70° C. and most preferably from 30° C. to 50° C. After this stabilization, the catalyst can be transported to the user/plant operator. When the catalyst user carries out step i) in-situ in the reactor, stabilization is dispensed with.

The shaped catalyst bodies are characterized, in that they comprise a Cu—Zn—Al mixed oxide being amorphous. Besides the amorphous Cu—Zn—Al mixed oxide the shaped catalyst bodies can contain further compounds like lubricants or additives, showing Bragg reflections.

In a further embodiment, the shaped catalyst body also comprises domains of CuO, ZnO and a Zn spinel, preferably a Zn spinel of gahnite structure, as determined by Pair Distribution Function (PDF) analysis. In one embodiment the phase content in weight percent (wt %), as determined by PDF, of CuO is in the range of from 10 to 20, preferably in the range of from 15 to 20, of ZnO is in the range of from 1 to 10, preferably of from 2 to 7, and of the Zn spinel of gahnite structure is in the range of from 70 to 89, preferably in the range of from 75 to 85.

The amount of Cu in the catalyst is in the range of from 30 to 50 mol-%, preferably of from 30 to 45 mol-%, in relation to the overall amount of Cu, Zn and Al in the catalyst.

The amount of Zn in the catalyst is in the range of from 15 to 45 mol-%, preferably of from 20 to 40 mol-%, in relation to the overall amount of Cu, Zn and Al in the catalyst.

The amount of Al in the catalyst is in the range of from 15 to 50 mol-%, preferably of from 20 to 40 mol.-%, in relation to the overall amount of Cu, Zn and Al in the catalyst.

The molar ratio of Cu and Zn in the catalyst is in the range of from 2.5 to 1.0, preferably of from 2.1 to 1.1.

In one embodiment the catalyst according to the invention comprises at least one promotor compound. This at least one promotor compound is preferably selected from the group consisting of compounds of alkali metals, preferably K, Rb or Cs, alkaline earth metals, preferably Mg, rare earth metals, preferably La or Ce, Ga, In, Si, V, Mn, Fe, Co, Y or Zr, and mixtures thereof. The at least one promotor may be included in the form of a metal oxide of the aforementioned metals in the shaped catalyst body of the invention. The metal oxide may comprise one or more oxides of the aforementioned metals. In the catalyst the at least one promotor compound is present in an amount in the range of 0.1-12 wt %, preferably in the range of 1-7 wt %, more preferably in the range of 3-5 wt %, based on the total weight of the catalyst.

In one embodiment the at least on promotor compound, preferably selected from the group consisting of compounds of rare earth metals, preferably La or Ce, Ga, In, Si, V, Mn, Fe, Co, Y or Zr, and mixtures thereof, is added to the solution comprising solved Cu, Zn and Al compounds of step a) and co-precipitated in step c). In another embodiment the at least one promotor compound, preferably selected from the group consisting of compounds of alkali metal or alkaline earth metals, and mixtures thereof is added to the precipitate or the shaped catalyst body by impregnation, incipient wetness or by mixing the precipitate with the promotor compound.

The catalyst of the invention preferably has a BET surface in the range of from 60 m²/g to 200 m²/g, preferably in the range of from 75 m²/g to 180 m²/g, most preferably of from 100 m²/g to 180 m²/g.

In one embodiment the shaped catalyst body has a pore volume in the range of from 200 to 500 mm³/g, preferably of from 250 to 450 mm³/g, most preferably of from 280 to 430 mm³/g.

In one embodiment the side crush strength of the shaped catalyst body lies in the range of from 40 to 250 N, preferably of from 80 to 220 N, more preferably of from 100 to 220 N, most preferably of from 150 N to 210 N.

In another embodiment the side crush strength of the shaped catalyst body after reduction lies in the range of from 10 N to 220 N, preferably of from 40 N to 220 N, more preferably of from 80 N to 160 N.

The catalyst of the invention is suitable for use in numerous reactions. Possible reactions include water gas shift reactions, especially LTS reaction, ester hydrogenolyses and hydrogenation of fatty acid esters.

In a preferred embodiment the catalyst obtained by the method according to the invention can be used for the water gas shift reaction, preferably low temperature shift (LTS) reaction, by use of a synthesis gas composition comprising CO, CO₂ and H₂. In one embodiment the CO content of the synthesis gas is 60% or less, preferably 20% or less. In a further embodiment the CO content is 0.1% or more. In a preferred embodiment the CO content is in the range of from 0.1 to 60%, preferably in the range of from 0.1 to 20%.

The temperature typically lies within a range of from 150 to 250° C., preferably within a range of from 160 to 240° C. and more preferably within a range of from 170 to 230° C.

The pressure typically lies within a range of from 1 to 50 bar, preferably within a range of from 1 to 30 bar and more preferably within a range of from 1 to 25 bar.

The catalyst according to the invention is typically reduced before employed in the LTS reaction.

The examples below demonstrate in more detail specific embodiments of the invention.

METHODS

Bulk Density

Figure 1:
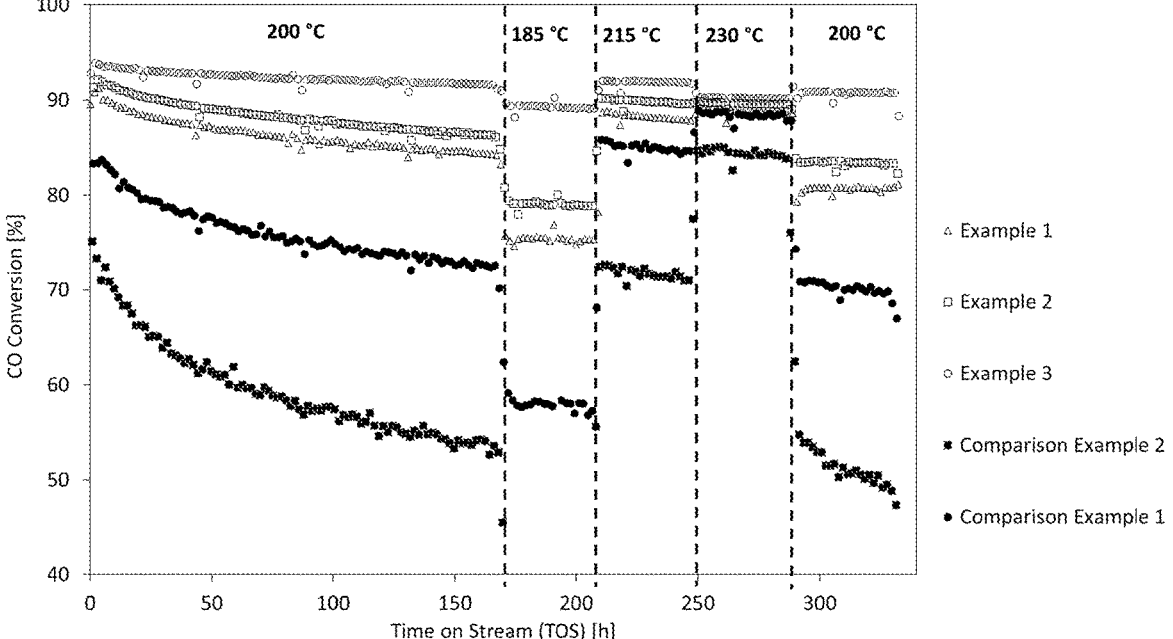
FIG. 1 shows the CO conversion of the catalysts according Examples 1 to 3 and Comparison Examples 1 and 2 at varying temperatures.

The determination of the bulk density of the shaped catalyst body was carried out in that a 100 mL measuring cylinder was completely filled with the catalyst samples. The bulk density was calculated by dividing the weight of catalyst samples filled into the measuring cylinder by the volume of 100 mL.

Loss on Ignition

The determination of the loss on ignition for the purposes of the present invention was carried out in that about 1-2 g of a sample of the material to be analyzed were weighted and this sample subsequently being heated under from room atmosphere to 900° C. and maintained at this temperature for 3 hours. The sample was subsequently cooled under a protective atmosphere and the remaining weight was measured. The difference between weight before and after the thermal treatment corresponds to the loss on ignition.

Side Crush Strength

The determination of the side crush strength of the shaped catalyst body was carried out in accordance with ASTM D4179-11, whereby no preheating of the samples was performed. Here, a statistically sufficient number of pellets (at least 20 pellets) were measured and the arithmetic mean of the individual measurements was calculated. This arithmetic mean corresponds to the side crush strength of a particular sample. For the reduced shaped catalyst body the same method was applied, whereby the samples, prior to measurement, were reduced in a mixture of hydrogen and nitrogen and kept under nitrogen during measurement.

Elemental Analysis

The determination of chemical elements was carried out by means of ICP (Inductively Coupled Plasma) measurement in accordance with DIN EN ISO 11885.

BET Surface Area

The specific BET surface area was determined by means of nitrogen adsorption in accordance with DIN 66131. The catalyst obtainable by the process of the invention preferably has a BET surface area in the range from 20 to 100 m2/g, in particular from 30 to 80 m2/g and particularly preferably from 40 to 60 m2/g.

Pore Volume

The pore volume of the shaped catalyst body was measured by the mercury porosimetry method in accordance with DIN 66133.

Structural Determination by PDF Analysis

The determination of local structures by PDF analysis was conducted, in that first XRD data of calcined materials and an empty capillary for reference were measured in transmission mode (1 mm diameter capillaries) by an Empyrean diffractometer using Molybdenum radiation ($Q_{max}$17.5 Å$^{-1}$) using variable counting time (VCT) method. PDF data from recorded XRD data were generated by Malvern Panalytical HighScore Plus software. Analysis of the experimental PDF data was performed using PDFgui program by fitting the observed PDF data against the calculated data which were generated by model structures (.cif files) in PDFgui. Contribution of the empty capillary was subtracted from the background of the observed data before fitting. Instrument related parameters such as peak broadening (Qbroad) and peak dampening (Qdamp) factors were determined by analyzing the PDF of a standard crystalline powder (measured in the same way as for the samples) and those were fixed throughout the data fitting process. Unit cell parameters and atomic displacement parameters of individual phases were refined stepwise.

Loss on Attrition

The loss on attrition was determined in that for a sample of approx. 110 g any fines were first separated by use of a 1 mm sieve, afterwards the samples was thermally treated at 120° C. for 3 hours and weighted.

Then 100 g of the sample were placed into a closed steel drum and rotated 1800 times at 60 rpm. Afterwards the sample was placed into a 1 mm sieve and separated from any fines. Finally, the sample was again thermally treated at 120° C. for 3 hours and weighted. The loss on attrition was calculated as difference between initial weight and final weight, divided by the initial weight.

EXAMPLES

Precursor A

In a solution of 9.031 kg concentrated nitric acid in 4.5 L deionized water 1.725 kg sodium aluminate and 0.565 kg zinc oxide were solved. The so obtained solution was added to a solution of 2.727 kg Cu(NO$_3$)·2.5H$_2$O dissolved in 4 L deionized water.

Afterwards the resulting solution was mixed with additional deionized water to result in an overall volume of 20 L.

The precipitating solution was provided by dissolving 1.136 kg NaCO$_3$ in 20 L deionized water followed by the addition of 3.000 kg of saturated sodium hydroxide solution and filling up to 30 L with deionized water.

The metal containing solution and the precipitating solution were then added dropwise into a batch containing 15 L deionized water, whereas the pH value rapidly increased to pH 9 and was kept at this pH during this addition and whereas the formation of a bluish suspension started. Once the addition of the metal-containing was finished, the addition of precipitating solution was stopped and the resulting bluish suspension was stirred for an additional hour at room temperature. The precipitate was removed from the suspension by filtration on a chamber filter press. The filter cake was washed with deionized water until the filtrate had an electrical conductivity of <250 µS/cm. This filter cake was used for preparation of the catalyst samples of Example 1 to 3. It revealed a Cu content of 31.6 mol %, a Zn content of 18.7 mol % and an Al content of 49.8 mol %.

Precursor B

In a solution of 7.007 kg concentrated nitric acid in 4.5 L deionized water 1.337 kg sodium aluminate and 0.576 kg zinc oxide were solved. The so obtained solution was added to a solution of 3.422 kg Cu(NO$_3$)·2.5H$_2$O dissolved in 4 L deionized water.

Afterwards the resulting solution was mixed with additional deionized water to result in an overall volume of 20 L.

The precipitating solution was provided by dissolving 1.136 kg NaCO$_3$ in 20 L deionized water followed by the addition of 3.500 kg of saturated sodium hydroxide solution and filling up to 30 L with deionized water.

The metal containing solution and the precipitating solution were then added dropwise into a batch containing 15 L deionized water, whereas the pH value rapidly increased to pH 9 and was kept at this pH during this addition and whereas the formation of a bluish suspension started. Once the addition of the metal-containing solution was finished, the addition of precipitating solution was stopped and the resulting bluish suspension was stirred for an additional hour at room temperature. The precipitate was removed from the suspension by filtration on a chamber filter press. The filter cake was washed with deionized water until the filtrate had an electrical conductivity of <250 µS/cm. This filter cake was used for preparation of the catalyst samples of Example 4 to 6. It revealed a Cu content of 40.8 mol %, a Zn content of 19.6 mol % and an Al content of 39.6 mol %.

Example 1

The filter cake of Precursor A was dried at 120° C. for 12 h, granulated and sieved by a 1 mm sieve and calcined at 450° C. for 2 h in a batch rotary calciner, whereby the filter cake was heated within the calciner with a heating ramp of 300° C./h. The calcined material was mixed with 2 wt. % graphite, compacted and tableted to result in tablets of 4.8 mm width and 3.2 mm height.

Example 2

The filter cake of Precursor A was suspended in deionized water to achieve a solid content of 18 wt. %. The suspension was processed by spray drier having an entrance temperature of 280° C. and outlet temperature of 110° C. The spray-dried precursor was calcined in a continuous rotary calciner at 500° C. for 15 minutes and with a mass flow rate of 300 g/h. The calcined material was mixed with 2 wt. % graphite, compacted and tableted to result in tablets of 4.8 mm width and 3.2 mm height.

Example 3

The same procedure as for Example 2 was applied with the exception that Cs$_2$CO$_3$ was added to the suspension before the spray-drying step resulting in a Cs content of the catalyst of 0.8 wt %.

Example 4

The filter cake of Precursor B was dried at 120° C. for 12 h, granulated and sieved by a 1 mm sieve and calcined at 450° C. for 2 h in a batch rotary calciner, whereby the filter cake was heated within the calciner with a heating ramp of 300° C./h. The calcined material was mixed with 2 wt. % graphite, compacted and tableted to result in tablets of 4.8 mm width and 3.2 mm height.

Example 5

The filter cake of Precursor B was suspended in deionized water to achieve a solid content of 18 wt. %. The suspension was processed by spray drier having an entrance temperature of 280° C. and outlet temperature of 110° C. The spray-dried precursor was calcined in a continuous rotary calciner at 500° C. for 15 minutes and with a mass flow rate of 300 g/h. The calcined material was mixed with 2 wt. % graphite, compacted and tableted to result in tablets of 4.8 mm width and 3.2 mm height.

Example 6

The same procedure as for Example 5 was applied with the exception that $Cs_2CO_3$ was added to the suspension before the spray-drying step resulting in a Cs content of the catalyst of 0.8 wt %.

Comparison Example 1

A solution was provided by dissolving 14.16 mol $Cu(NO_3)_2 \cdot 2.5H_2O$, 2.93 mol ZnO and 7.04 mol sodium aluminate in a nitric acid solution resulting in a volume of 20 L.

The metal containing solution and a 3.3M NaOH solution were then added dropwise into a batch vessel containing 15 L deionized water, whereas the pH value rapidly raised and kept within a range of 9.5-10. Once the addition of the metal-containing solution was finished, the addition of precipitating solution was stopped and the resulting bluish suspension was stirred for additional 3 hours at room temperature. The precipitate was removed from the suspension by filtration on a chamber filter press. The filter cake was washed with deionized water until the filtrate had an electrical conductivity of <250 μS/cm. This filter cake was dried at 120° C. for 6 hours, followed by calcination at 400° C. for 15 minutes and with a mass flow rate of 300 g/h. It revealed a Cu content of 60.5 mol %, a Zn content of 12.5 mol % and an Al content of 27.0 mol %.

The resulting material was afterwards mixed with 2 wt. % graphite, compacted and tableted to result in tablets of 0.48 mm width and 3.2 mm height.

Comparison Example 2

A solution was provided by dissolving 6.81 mol $Cu(NO_3)_2 \cdot 2.5H_2O$, 8.88 mol ZnO and 4.81 mol sodium aluminate in a nitric acid solution resulting in a volume of 20 L. The metal containing solution was heated to 90° C. and added dropwise into a batch vessel containing a precipitating solution obtained by dissolution of 1.350 kg $Na_2CO_3$ in 26 L deionized water, whereas this solution is intensively stirred during the addition of the metal containing solution.

During addition of the metal containing solution, the pH value of the precipitating solution decreases from initially 10 to 5 after complete addition of the metal containing solution.

Once the addition of the metal-containing solution was finished, the resulting bluish suspension was stirred for additional 30 minutes at 90° C. The precipitate was removed from the suspension by filtration on a chamber filter press. The filter cake was washed with deionized water until the filtrate had an electrical conductivity of <250 μS/cm. This filter cake was calcined at 450° C. for 24 h in a muffle furnace. It revealed a Cu content of 33.6 mol %, a Zn content of 44.1 mol % and an Al content of 22.3 mol %.

The resulting material was afterwards mixed with 2 wt. % graphite, compacted and tableted to result in tablets of 4.8 mm width and 3.2 mm height.

Table 1 summarizes some characteristic data of the prepared catalysts.

TABLE 1

| | Properties of Examples 1 to 6 and Comparative Examples 1 and 2 | | | | | | | | |
|---|---|---|---|---|---|---|---|---|---|
| Example | BET surface area [m²/g] | $CO_2$ content [wt %] | Loss on attrition [%] | Hg pore volume [mm³/g] | Porosity [%] | Average pore radius [nm] | SCS [N] | SCS-RS [N] | Bulk density 100 mL [kg/L] |
| Example 1 | 123 | 4.1 | n.d. | 282 | 43.25 | 10.52 | 196 | n.d. | n.d. |
| Example 2 | 174 | 2.6 | 1.79 | 406 | 52.08 | 7.88 | 173 | n.d. | n.d. |
| Example 3 | 173 | 2.6 | 1.86 | 389 | 52.08 | 7.35 | 170 | 100 | 0.69 |
| Example 4 | 79 | 5.6 | n.d. | 289 | 48.25 | 12.64 | 206 | n.d. | n.d. |
| Example 5 | 111 | 4.4 | 1.61 | 412 | 55.48 | 14.00 | 168 | n.d. | n.d. |
| Example 6 | 103 | 4.6 | 1.51 | 419 | 57.47 | 14.80 | 164 | 154 | 0.73 |
| Comparison Example 1 | 107 | — | 5.00 | 114 | 29.41 | 4.59 | 175 | 81 | 1.47 |
| Comparison Example 2 | 86 | 3.5 | 3.00 | 393 | 60.84 | 14.64 | 191 | 173 | 0.84 |

Application Example 1

The catalysts of Example 1 to 6 as well as of Comparison Example 1 and 2 were tested in the CO conversion reaction.

A reactor with 2 mm inner diameter was loaded with 220 mg of the corresponding sample, which was provided by grinding the corresponding tablets and separating a sieve fraction from 200-300 μm.

Figure 2:
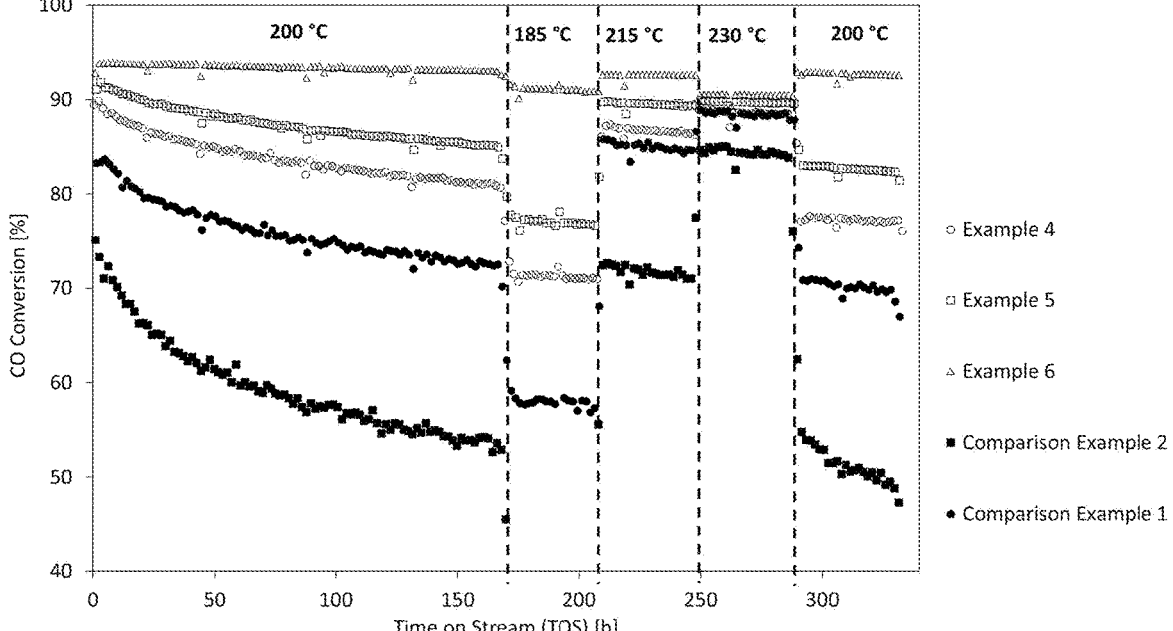
FIG. 2 shows the CO conversion of the catalysts according Examples 4 to 6 and Comparison Examples 1 and 2 at varying temperatures.

The reaction took place at a pressure of 25 barg with a synthesis gas feed comprising 3 vol % CO, 17 vol % $CO_2$, 60 vol % $H_2$ and 20 vol % $N_2$, a steam/gas ratio of 0.35 at different temperatures. One can see in FIG. 1 and FIG. 2 that the samples according to the invention show improved CO conversion and reduced deactivation rates as compared to the comparison examples.

The invention claimed is:

1. Catalyst for an LTS reaction, comprising an amorphous Cu—Zn—Al mixed oxide, wherein the catalyst is present as a tableted shaped body.

2. Catalyst according to claim 1, whereby it comprises domains of CuO, ZnO and a Zn spinel, as determined by Pair Distribution Function (PDF) analysis.

3. Catalyst according to claim 1, wherein the catalyst is present as a tableted shaped body with a side crush strength of from 40 to 250 N.

4. Catalyst according to claim 1, wherein the amount of Cu is in the range of from 30 to 50 mol-%, the amount of Zn is in the range of from 15 to 45 mol-%, and the amount of Al is in the range of from 15 to 50 mol-%, in relation to the overall amount of Cu, Zn and Al in the catalyst.

5. Catalyst according to claim 1, wherein the phase content in weight percent, as determined by PDF analysis, of CuO is in the range of from 10 to 20, of ZnO is in the range of from 1 to 10, and of the Zn spinel of gahnite structure is in the range of from 70 to 89.

6. Process for the preparation of the catalyst according to claim 1, comprising the following steps:

a) Providing an aqueous solution comprising solved Cu, Zn and Al compounds b) Providing an aqueous solution comprising a carbonate and additionally an alkali metal hydroxide or alkaline earth metal hydroxide, having a pH value of 8 or higher c) mixing the solution obtained in step a) and the carbonate solution and additionally an alkali metal hydroxide or alkaline earth metal hydroxide obtained in step b) to obtain a mixture comprising a precipitate of mixed Cu—Zn—Al hydroxide-carbonate d) Ageing the mixture obtained after step c)

e) Separating the precipitate from the solution and optionally washing and/or drying the precipitate f) Calcining the precipitate at a temperature in the range of from 200° C. to 600° C., for a duration in the range of from 15 minutes to 8 hours, wherein the pH value after step c) is 8 or higher and wherein the precipitate after step f) is formed to obtain a shaped catalyst body in a step g).

7. Process according to claim 6, wherein the pH value after step c) lies within a range of from 8 to 9.

\* \* \* \* \*